US012061795B2

(12) United States Patent
Wooley et al.

(10) Patent No.: US 12,061,795 B2
(45) Date of Patent: Aug. 13, 2024

(54) REPAIR ELEMENT AVAILABILITY COMMUNICATION

(71) Applicant: Micron Technology, Inc., Boise, ID (US)

(72) Inventors: Loren Jeffrey Wooley, Boise, ID (US); Yoshinori Fujiwara, Boise, ID (US); Randall James Rooney, Boise, ID (US)

(73) Assignee: Micron Technologies, Inc., Boise, ID (US)

( * ) Notice: Subject to any disclaimer, the term of this patent is extended or adjusted under 35 U.S.C. 154(b) by 138 days.

(21) Appl. No.: 17/315,062

(22) Filed: May 7, 2021

(65) Prior Publication Data

US 2022/0357856 A1 Nov. 10, 2022

(51) Int. Cl.
*G06F 3/06* (2006.01)

(52) U.S. Cl.
CPC .......... *G06F 3/0614* (2013.01); *G06F 3/0659* (2013.01); *G06F 3/0679* (2013.01)

(58) Field of Classification Search
CPC .... G06F 3/0614; G06F 3/0659; G06F 3/0679; G06F 11/2205; G06F 11/1666
See application file for complete search history.

(56) References Cited

U.S. PATENT DOCUMENTS

| 2007/0118701 | A1* | 5/2007 | McFadyen | .......... | G06F 13/4243 |
| | | | | | 711/154 |
| 2012/0230136 | A1 | 9/2012 | Gorman et al. | | |
| 2015/0294741 | A1* | 10/2015 | Zhang | .................... | G11C 29/82 |
| | | | | | 365/185.11 |
| 2016/0062819 | A1* | 3/2016 | Oh | ......................... | G11C 29/70 |
| | | | | | 714/6.11 |
| 2016/0307647 | A1* | 10/2016 | Morgan | ................. | G11C 17/16 |
| 2018/0114588 | A1* | 4/2018 | Houg | ..................... | G11C 29/78 |
| 2020/0278802 | A1* | 9/2020 | Suh | ........................ | G11C 7/222 |
| 2022/0269419 | A1* | 8/2022 | Kim | ..................... | G06F 3/0673 |

FOREIGN PATENT DOCUMENTS

KR  20210025682  3/2021

OTHER PUBLICATIONS

"International Search Report and Written Opinion", Application No. PCT/US2022/072180, dated Aug. 12, 2022, 11 pages.
"International Preliminary Report on Patentability", Application No. PCT/US2022/072180, dated Oct. 24, 2023, 8 pages.

* cited by examiner

*Primary Examiner* — Charles Rones
*Assistant Examiner* — Jonah C Krieger
(74) *Attorney, Agent, or Firm* — Colby Nipper PLLC

(57) ABSTRACT

This document describes aspects of communicating information about repair elements of a memory device. A memory device can include multiple repair elements that can each replace a defective or damaged memory element, such as a memory row, using a repair operation. By knowing a quantity of remaining available repair elements, a user of a memory device can make informed decisions about whether to make a replacement. In operation, a host device can send a command to the memory device requesting repair element information. Logic of the memory device can determine a quantity of repair elements that are available for a repair operation. In some cases, the logic may store this quantity in a register of the memory device. The memory device can signal the quantity of repair elements to the host device in response to the command.

37 Claims, 10 Drawing Sheets

600 ↘

| Type | Register 602 | | | | | | | |
|---|---|---|---|---|---|---|---|---|
| | R/W | | | | | R | | |
| Opcode: | OP7 | OP6 | OP5 | OP4 | OP3 | OP2 | OP1 | OP0 |
| Function: | BG2 | BG1 | BG0 | BA1 | BA0 | AV2 | AV1 | AV0 |

604 ────────────────── 606 ──────────

| Type | Register 608 | | | | | | | |
|---|---|---|---|---|---|---|---|---|
| | R | | | | | | | |
| Opcode: | OP7 | OP6 | OP5 | OP4 | OP3 | OP2 | OP1 | OP0 |
| Function: | ... | ... | ... | AV4 | AV3 | AV2 | AV1 | AV0 |

REPAIR ELEMENT AVAILABILITY COMMUNICATION

BACKGROUND

Due to ever-improving manufacturing techniques, a single memory device may include many billions of memory cells in which to store information. For example, a double data rate dynamic random-access memory (DDR DRAM) device may include more than 64 billion memory cells to store bits (64 Gigabits/Gb) of information. These memory devices include an architecture, which aids in storing and retrieving data from the devices, such as an architecture where the memory cells are arranged in rows and columns within memory arrays.

Even these ever-improving manufacturing techniques, however, introduce defects in some memory cells. Because of these defects, repair operations are used to correct the defects by replacing, for instance, a row or column that contains a defective memory cell with a repair element that does not contain defective memory cells.

BRIEF DESCRIPTION OF THE DRAWINGS

Apparatuses of and techniques for repair element availability communication are described with reference to the following drawings. The same numbers are used throughout the drawings to reference like features and components:

FIG. 6 illustrates example details of registers that a memory device may use to implement aspects of repair element availability communication;

DETAILED DESCRIPTION

Overview

Figure 1:
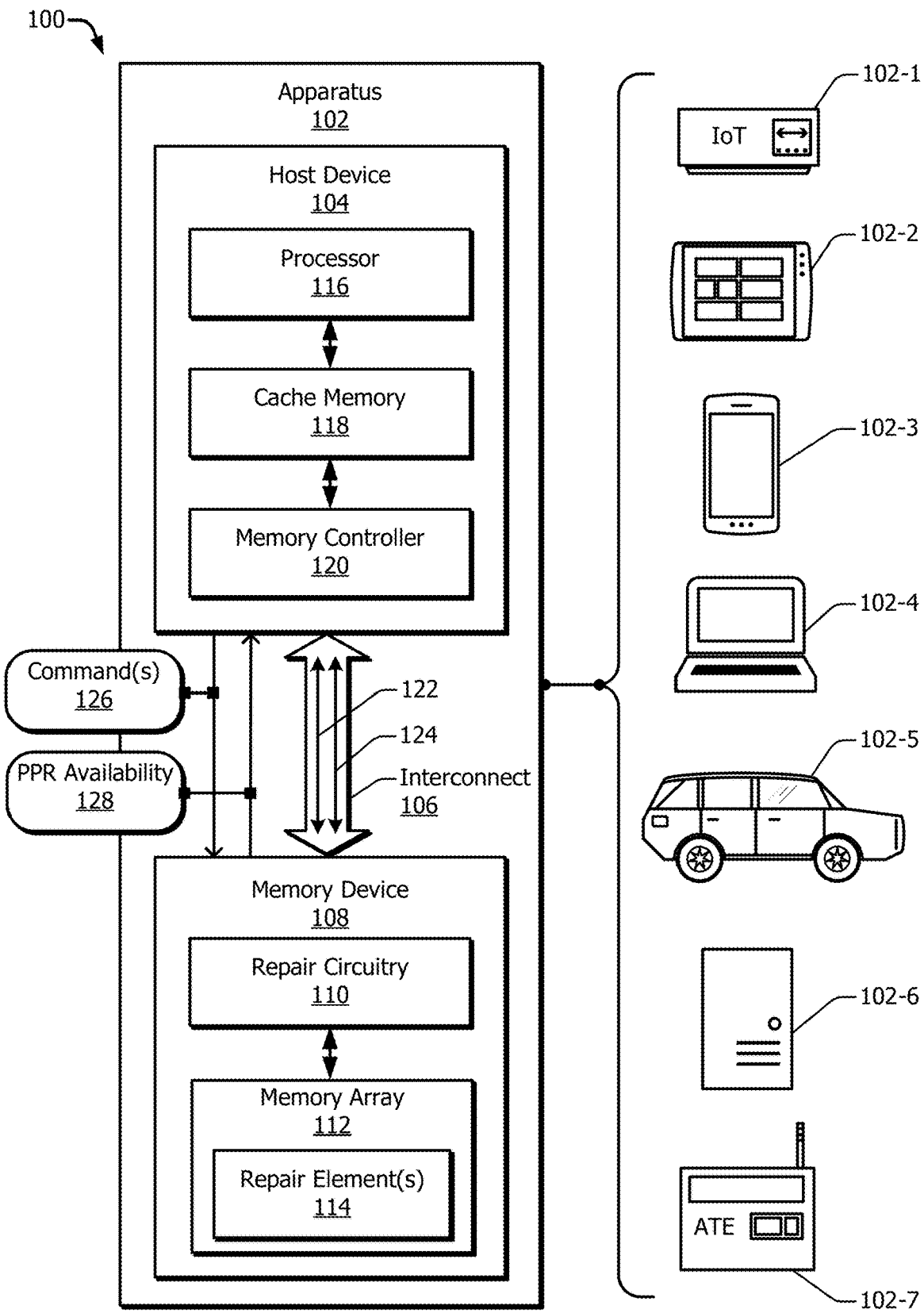
FIG. 1 illustrates example apparatuses that can implement repair element availability communication.

Given the significant quantity of memory cells in a memory device today, semiconductor manufacturing processes commonly introduce defects to one or more of the memory cells. For example, even in a tightly controlled manufacturing environment, contamination may impinge one of the memory cells. As another example, a memory device design may demand that a tool used to manufacture the memory device operates at an edge of its process capability. Such tool operation can lead to a critical dimension of one or more memory cells of the memory device failing to meet a target desired for optimum performance.

To help address these issues, memory device manufacturers provide repair elements in a memory device. These repair elements, generally corresponding to redundant rows or columns of memory cells, may correspond or be coupled to a memory array (e.g., a memory bank) within the memory device. During a testing operation, the memory device manufacturer may detect a defective memory cell within the memory array. As part of compensating for the defect, the manufacturer may perform a repair operation internal to the memory device that, through a fusing operation that reroutes addressing within the memory device, effectively replaces a row or column containing the defective memory cell with an available repair element.

Upon receiving the memory device from the memory device manufacturer, a memory device user (e.g., an original equipment manufacturer (OEM), an outsourced assembly-test (OSAT) service provider, and end memory device user or consumer) may introduce additional defects. For example, the memory device user may introduce additional defects to the memory device through thermally-induced damage during a solder-reflow operation while mounting the memory device to a printed circuit board (PCB). As another example, the memory device user may target an in-field use of the memory device for an application or environment that exceeds recommended operating thresholds (e.g., an application where a junction temperature of the memory device exceeds a threshold). Such an application or environment may prematurely damage or wear out memory cells of the memory device.

In an example approach, memory manufacturers can enable the memory device user to perform repair operations to compensate for defects that they may induce. For instance, memory device designs for DDR DRAM may allow the memory device user to access post package repair (PPR) modes available on the memory device, through which the memory device user may perform a repair operation similar to that performed by the manufacturer of the memory device.

In general, the memory device user may access a PPR mode to repair the memory device using signaling between a host device and the memory device. For example, a memory controller of the host device may signal a command, such as mode register write (MRW) command or a multi-purpose command (MPC), to the memory device. The command may include a set of one or more operands (e.g., a combination or sequence of bits) that are written to a register (e.g., a mode register) of the memory device.

In response, the memory device (e.g., operative logic included on the memory device) may process the command to determine a repair state of the memory device. The memory device may then write a second set of operand(s), which are indicative of the repair state, to the register. The repair state may generally correspond to an availability status of repair elements within the memory device (e.g., the availability of redundant rows or columns of memory cells for a repair operation).

Upon receiving another command, such as a mode register read (MRR) command, the memory device may signal, to the host device, the second set of operands. Upon receiving the second set of operands, the host device may determine that repair elements are available and proceed with repairing the memory device.

Several PPR modes are possible. A first example PPR mode includes a hard post package repair (hPPR) mode through which the memory device user may perform a repair operation that permanently repairs the memory device. In this context, "permanently" refers to a repair that can persist after power has been removed from the memory device. Techniques for repairing the memory device while in the hPPR mode may include, for example, programming electrical fuses of the memory device to physically re-route addressing of rows or columns of memory cells within the memory device. For instance, fuse traces can physically reroute address lines from a row or column within a memory bank that has at least one defective memory cell to a repair element that is corresponding to the memory bank and has no defective memory cells.

A second example PPR mode includes a soft post package repair (sPPR) mode though which the memory device user may perform a repair operation that temporarily repairs the DDR DRAM memory device. In this context, "temporarily" refers to a repair that is extinguished by the removal of power from the memory device. Techniques for repairing the memory device while in the sPPR mode may include, for example, a memory controller temporarily latching an address of a repair element that is coupled to a memory bank. The repair element contains no defective memory cells and is used in place of an address of a row or column of the memory bank that contains at least one defective memory cell. In some instances, a repair performed using the sPPR mode may be reversed via a command (e.g., an "sPPR Undo" command) that reverses the repair operation without removal of power.

A third example PPR mode includes a memory built-in self-test post package repair (MBIST-PPR or mPPR). In general, the memory device user may access one or more of the above post package repair modes (e.g., hPPR mode, sPPR mode, or mPPR mode) to repair the memory device.

As noted above, the memory device user may access a register of the memory device to obtain information on one or more repair states of the memory device. These repair states include (i) a first state in which the memory device user is informed an unknown quantity of repair elements are available on the memory device (e.g., a state in which at least one repair element is available) and (ii) a second state in which the memory device user is informed there are no repair elements available on the memory device. The limitations of these two states may be problematic for the memory device user.

For example, as part of managing the memory device's lifecycle, the memory device user may project a downstream manufacturing operation with a first need for a first quantity of repair elements. The memory device user may further project field use with a second need for a second quantity of repair elements. However, the absence of transparency into the quantity of repair elements available at a given time, as bounded by the two states of the current PPR modes, compromises the memory device user's ability to strategically and efficiently allocate correct quantities of repair elements for these needs.

With growing interest by memory device users to utilize PPR for predictive failure analysis (PFA) and time-zero repair needs, enhancements to techniques that rely on Boolean-based PPR registers are needed. For example, enhancements that include providing the memory device users with transparency into quantities of available repair elements will, in general, allow memory device users to improve reliability of memory devices through appropriate allocation of available repair elements. Furthermore, knowing the availability of repair elements will improve serviceability to products that may experience field failures using the memory devices.

This document therefore describes aspects of implementing repair element availability communication to enable a memory device user to be informed about quantities of repair elements that may be available to the memory device user for repair operations with a given memory device. Although some of this disclosure describes principles in terms of post-package repair (PPR), the principles are also applicable to memory devices and the operation thereof that occur prior to packaging. Further, although application of these principles is described in terms of memory device users, the subject matter of this document is also applicable to memory device manufacturers.

Example Operating Environments

FIG. 1 illustrates, at 100 generally, example apparatuses 102 that can implement PPR transparency. The apparatus 102 can be realized as, for example, at least one electronic device. Example electronic-device implementations include an internet-of-things (IoTs) device 102-1, a tablet device 102-2, a smartphone 102-3, a notebook computer 102-4 (or desktop computer), a passenger vehicle 102-5, and a server computer 102-6 that may be part of cloud computing infrastructure or a data center, and a portion thereof (e.g., a printed circuit board (PCB)). Example electronic-device implementations may also include an automated test equipment (ATE) 102-7, instances of which may include a burn-in and test chamber, a packaged-component test system, a memory module test system, a wafer prober, and so on.

Other examples of the apparatus 102 include a wearable device, such as a smartwatch or intelligent glasses; an entertainment device, such as a set-top box or video dongle, a smart television, or a gaming device; a motherboard or server blade; a consumer appliance; a vehicle or drone, or the electronic components thereof; industrial equipment; a security or other sensor device; and so forth. Each type of electronic device or other apparatus can include one or more components to provide some computing functionality or feature.

In example implementations, the apparatus 102 can include at least one host device 104, at least one interconnect 106, and at least one memory device 108. In some instances, aspects of the apparatus 102 may be distributed across multiple electronic devices (e.g., the host device 104 may be incorporated as part of the ATE 102-7 while the memory device 108 may be incorporated as part of a discrete, packaged component or as part of a memory module).

The memory device 108 may be realized, for example, with a dynamic random-access memory (DRAM) die or module, including a three-dimensional (3D) stacked DRAM device, such as a high bandwidth memory (HBM) device or a hybrid memory cube (HMC) device. The memory device 108 may operate as a main memory. Although not shown, the apparatus 102 can also include storage memory. The storage memory may be realized, for example, with a storage-class memory device, such as one employing 3D XPoint™ or phase-change memory (PCM), a hard disk or solid-state drive, or flash memory.

The memory device 108 may include combinations of integrated circuitry that may be used as part of repair element availability communication. For instance, the memory device 108 may include repair circuitry 110 and at least one memory array 112 (e.g., at least one memory bank) having memory cells arranged in rows and columns. An example of the repair circuitry 110 would be hard post package repair (hPPR) circuitry. One or more repair element (s) 114 (e.g., one or more rows, columns, or blocks of memory cells) may correspond to, and may be coupled to, the memory array 112.

The host device 104 can include at least one processor 116, at least one cache memory 118, and at least one memory controller 120. Regarding the host device 104, the processor 116 is coupled to the cache memory 118, and the cache memory 118 is corresponding to the memory controller 120. The processor 116 is also coupled, directly or indirectly, to the memory controller 120. The host device 104 may include other components to form, for instance, a system-on-a-chip (SoC). The processor 116 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communications processor (e.g., a modem or baseband processor), an SoC, and so forth.

The memory controller 120 may be coupled to a physical interface (e.g., a high-level or logical interface) between the processor 116 and at least one memory (e.g., a memory that is external to the host device 104, such as the memory device 108). The memory controller 120 can, for example, receive memory requests from the processor 116 and provide the memory requests, or commands, to the external memory with appropriate formatting, timing, reordering, and so forth. The memory controller 120 can also forward to the processor 116 responses to the memory requests that the memory controller 120 receives from the external memory.

Regarding connections that are external to the host device 104, the host device 104 is corresponding to the memory device 108 via the interconnect 106. The memory device 108 may be coupled to a storage memory (not shown). The depicted interconnect 106, as well as other interconnects (not shown) that communicatively couple together various components, enable data to be transferred between two or more components of the various components. Interconnect examples include a bus, a switching fabric, one or more wires that carry voltage or current signals, a test interface such as a burn-in board or test socket, and so forth. The interconnect 106 can include at least one command and address bus 122 (CA bus 122) and at least one data bus 124 (DQ bus 124). Each bus may be implemented as a unidirectional bus or a bidirectional bus. The interconnect 106 may also include a clock bus (CK bus—not shown) that is part of or separate from the command and address bus 122. The CA and DQ buses 122 and 124 may be coupled to CA and DQ pins, respectively, of the memory device 108. In some implementations, the interconnect 106 may also include a chip-select (CS) I/O (not shown) that can, for example, be coupled to one or more CS pins of the memory device 108.

The depicted components of the apparatus 102 represent an example computing architecture with a hierarchical memory system. A hierarchical memory system may include memories at different levels, with each level having a memory with a different speed or capacity. As shown, the cache memory 118 is logically coupled between the processor 116 and the memory controller 120. Here, the cache memory 118 is at a higher level of the hierarchical memory system than is the memory device 108. A storage memory, in turn, can be deployed at a lower level than the main memory as represented by the memory device 108. At lower hierarchical levels, memories may have decreased speeds but increased capacities relative to memories at higher hierarchical levels.

Although various implementations of the apparatus 102 are depicted in FIG. 1 and described herein, an apparatus 102 can be implemented in alternative manners. For example, the host device 104 may include multiple cache memories, including multiple levels of cache memory, or may have no cache memory. In some cases, the host device 104 may omit the processor 116 or the memory controller 120. A memory, such as the memory device 108, may have a respective "internal" or "local" cache memory (not shown). Further, there may be a cache memory between the host device 104 and the memory device 108. Generally, the illustrated and described components may be implemented in alternative ways, including in distributed or shared memory systems. A given apparatus 102 may also include more, fewer, or different components.

The host device 104 and the various memories may be realized in multiple manners. In some cases, the host device 104 and the memory device 108 can both be disposed on, or physically supported by, a same PCB (e.g., a rigid or flexible motherboard). The host device 104 and the memory device 108 may additionally be integrated on a same IC or fabricated on separate ICs but packaged together. A memory device 108 may also be coupled to multiple host devices 104 via one or more interconnects 106 and may be able to respond to memory requests from two or more of the host devices 104. Each host device 104 may include a respective memory controller 120, or the multiple host devices 104 may share a common memory controller 120. An example computing system architecture with at least one host device 104 that is coupled to a memory device 108 is described below with reference to FIG. 2.

The electrical paths or couplings realizing the interconnect 106 can be shared between two or more memory components (e.g., modules, dies, banks, or bank groups). In some implementations, the CA bus 122 is used for transmitting addresses and commands from the memory controller 120 to the memory device 108, which transmitting may be to the exclusion of propagating data. The DQ bus 124 can propagate data between the memory controller 120 and the memory device 108. The memory device 108 may include or be configured with multiple memory banks (not shown in FIG. 1). The memory device 108 may be realized with any suitable memory and/or storage facility including, but not limited to: Dynamic Random-Access Memory (DRAM), Synchronous DRAM (SDRAM), three-dimensional (3D) stacked DRAM, DDR DRAM, or Low-Power DDR (LPDDR) memory, including LPDDR DRAM and LPDDR SDRAM.

The memory device 108 may be described in terms of forming at least part of a main memory of the apparatus 102. The memory device 108 may, however, form at least part of a cache memory, a storage memory, an SoC, and so forth of an apparatus 102.

The host device 104 (e.g., the memory controller 120 of the host device 104) may, in some instances, transmit a series of one or more command(s) 126 to the memory device 108 that direct the memory device 108 to perform one or more repair element availability communication operations. As examples, the command(s) 126 may include combinations of a mode register write (MRW) command, a multipurpose command (MPC), or a mode register read (MRR) command. In general, the command(s) 126 can be transmitted through the interconnect 106 (e.g., using the CA bus 122). In instances of the command(s) 126 including an MRW command or an MPC command, the command(s) may include a first set of operands (e.g., a sequence of ordered bits) that may be decoded by the repair circuitry 110 to determine a memory array 112 (e.g., a memory bank) for which a repair operation may be desired.

In response to receiving one of the command(s) 126, the memory device 108 may perform the one or more repair element availability communication operations. Such operations may include, for example, the repair circuitry 110 decoding the command to identify the command as pertaining to quantizing available repair elements, processing the command to identify the memory array 112, accessing counting circuitry that indicates a quantity of the repair element(s) 114 corresponding to the memory array 112 that are available for a repair operation, and writing a set of operands (e.g., a sequenced combination of bits) to a register of the memory device 108. The set of operands may be indicative of the quantity of the repair element(s) that are available to repair the memory array 112.

Figure 2:
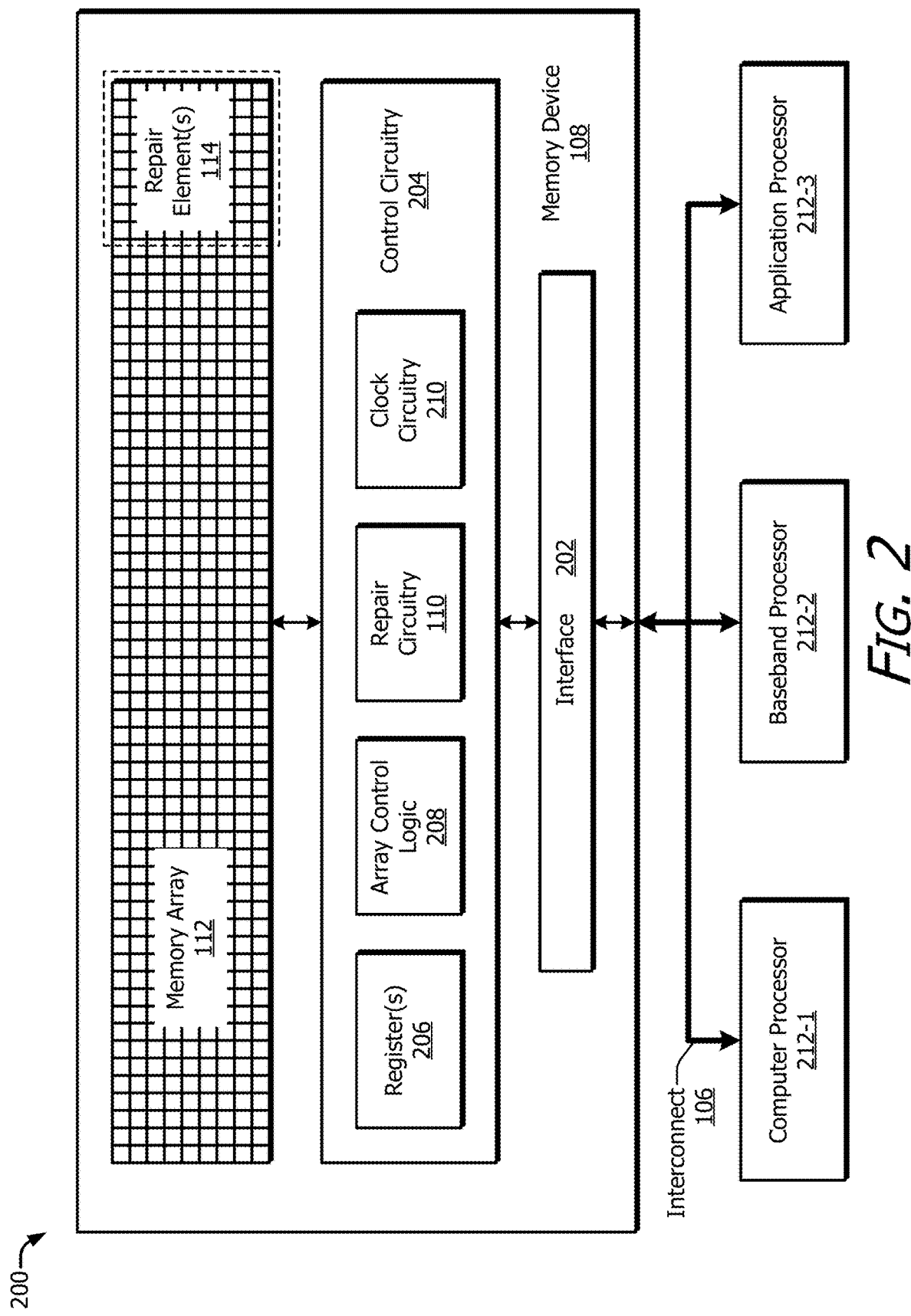
FIG. 2 illustrates example computing systems that can implement aspects of repair element availability communication.

FIG. 2 illustrates an example computing system 200 that can implement aspects of repair element availability communication. In some implementations, the computing system 200 includes at least one memory device 108, at least one interconnect 106, and at least one processor 206. The memory device 108 can include the memory array 112 and one or more instances of the repair element(s) 114 (e.g., one or more instances of redundant rows and/or columns of memory cells corresponding to the memory array 112). Although the memory array 112 may include a row-and-column architecture, other architectures of memory cells (and configurations of the repair element(s) 114) may be included in the memory device 108.

Furthermore, the memory device 108 can include least one interface 202 and control circuitry 204 that is communicatively corresponding to the memory array 112. The memory device 108 can correspond to a main memory or a storage memory of the apparatus 102 of FIG. 1. Thus, the memory array 112 can include an array of memory cells, including but not limited to memory cells of Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), or Low-Power Double Data Rate (LPDDR) Synchronous Dynamic Random-Access Memory (SDRAM). The memory array 112 and the control circuitry 204 may be components on a single semiconductor die or on separate semiconductor dies. The memory array 112 or the control circuitry 204 may also be distributed across multiple dies.

The control circuitry 204 can include any of a number of components that can be used by the memory device 108 to perform various operations. These operations can include communicating with other devices, managing performance, and performing memory read or write operations. For example, the control circuitry 204 can include one or more register(s) 206, at least one instance of array control logic 208, clock circuitry 210, and the repair circuitry 110. In some instances, the register(s) 206 can include register(s) relating to repair element quantization or communication, such as an hPPR resources mode register or a register that an sPPR resources mode register. In some instances, the register(s) 206 may store operands received as part of a mode register write (MRW) command or a multi-purpose command (MPC) received from a host device (e.g., the host device 104 of FIG. 1). The register(s) 206 may also store operands received from the repair circuitry 110.

The array control logic 208 may be implemented as circuitry that can provide command decoding, address decoding, input/output functions, amplification circuitry, power supply management, power control modes, and other functions. The clock circuitry 210 may be implemented as circuitry that can provide synchronization of various components of the memory device 108 with one or more external clock signals that may be provided over the interconnect 106, such as a command/address clock (e.g., CK_t or CK_c) or a data clock (e.g., WCK_t or WCK_c), and/or with at least one clock signal that is generated internally.

The interface 202 can couple the control circuitry 204 or the memory array 112 directly or indirectly to the interconnect 106. As shown in FIG. 2, the register(s) 206, the array control logic 208, the repair circuitry 110, and the clock circuitry 210 can be part of a single component (e.g., the control circuitry 204). In other implementations, one or more of the register(s) 206, the array control logic 208, the repair circuitry 110, or the clock circuitry 210 may be implemented as separate components, which can be provided on a single semiconductor die or disposed across multiple semiconductor dies. These components of the control circuitry 204 may be individually or jointly coupled to the interconnect 106 via the interface 218. The control circuitry 204, in general, may be configured to read operands from or write operands to at least one register(s) 206.

The interconnect 106 may be implemented with any one or more of a variety of interconnects that communicatively couple together various components and enable commands, addresses, and/or other information and data to be transferred between two or more of the various components (e.g., between the memory device 108 and the one or more processors 212). Although the interconnect 106 is represented with a single arrow in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address (CA) bus 122 and a data (DQ) bus 124 (as depicted in FIG. 1).

In some aspects, the memory device 108 may be realized as a "separate" physical component relative to the host device 104 (of FIG. 1) or any of the processors 212. Examples of physical components that may be separate include, but are not limited to, a printed circuit board (PCB), which can be rigid or flexible; a memory card; a memory stick; and a memory module, including a single in-line memory module (SIMM) or a dual in-line memory module (DIMM). Thus, separate physical components may be located together within a same housing of an electronic device or may be distributed over a server rack, a data center, and so forth. Alternatively, the memory device 108 may be packaged or integrated with other physical components, including a host device 104 or a processor 212, such as by being combined on a common PCB or together in a single device package or by being integrated into an SoC.

The apparatuses and methods that are described herein may be appropriate for memory that is designed for double data-rate (DDR) operations or that is targeted for energy-efficient applications. Thus, the described principles may be incorporated into a DDR memory device. An example of a memory standard that relates to DDR applications is the DDR5 synchronous DRAM (DDR5 SDRAM) as promulgated by the Joint Electron Device Engineering Council (JEDEC) Solid State Technology Association. Some terminology in this document may draw from one or more of these standards or versions thereof, like the DDR5 standard, for clarity. The described principles, however, are also applicable to memories that comport with other standards, including other DDR standards (e.g., earlier versions such as DDR4 SDRAM or future versions like DDR6 SDRAM), and to memories that do not adhere to a public standard.

As shown in FIG. 2, the one or more processors 212 may include a computer processor 212-1, a baseband processor 212-2, and an application processor 212-3, which are corresponding to the memory device 108 through the interconnect 106. The processors 212 may each be, or may form a part of, a CPU, a GPU, an SoC, an ASIC, an FPGA, or the like. In some cases, a single processor can comprise multiple processing resources, each dedicated to different functions, such as modem management, applications, graphics, central processing, or the like. In some implementations, the baseband processor 212-2 may include or be coupled to a modem (not shown in FIG. 2) and may be referred to as a modem processor. The modem and/or the baseband processor 212-2 may be coupled wirelessly to a network via, for example, cellular, Wi-Fi®, Bluetooth®, near field, or another technology or protocol for wireless communication.

In some implementations, the processors 212 may be connected directly to the memory device 108 (e.g., via the interconnect 106 as shown). In other implementations, one or more of the processors 212 may be indirectly connected to the memory device 108 (e.g., over a network connection or through one or more other devices). Further, each processor 212 may be realized similarly to the processor 116 of FIG. 1. Accordingly, a respective processor 212 can include or be associated with a respective memory controller, like the memory controller 120 depicted in FIG. 1. Alternatively, two or more processors 212 may access the memory device 108 using a shared or system memory controller 120.

The repair circuitry 110 may, in general, include logic that is operative to provide repair element availability communication The repair circuitry 110 may including counting circuitry that can, for instance, determine a quantity of repair elements (e.g., a quantity of instances of the repair element(s) 114) that are available to repair the memory device 108 or a particular memory array or memory bank thereof. A number of techniques may be used by the repair circuitry 110 (e.g., counting circuitry within the repair circuitry 110) to determine the quantity. For example, the repair circuitry 110 may scan fuses allocated for repair operations (e.g., determine, from fuses allocated for repair operations, how many are already programmed or blown). As another example, the repair circuitry 110 may access a storage mechanism on the memory device 108 that stores the quantity (e.g., during a previous testing or repair operation, a host device 104 or memory device 108 may have written the quantity into a register, used one or more flip flops included in control circuitry of the memory device 108, etc.)

After determining the quantity of repair elements that are available to repair the memory device, the repair circuitry 110 may then provide a value (e.g., using one or more bits as a set of operands) indicative of the quantity to one or more of the register(s) 206. In response to a further command, such as a mode register read (MRR) command received from a host device (e.g., the host device 104 of FIG. 1), the memory device 108 may transmit the set of operands to the host device. Alternatively, the memory device 108 may transmit the set of operands to the host device in accordance with some timing determinable by (e.g., a time period programmed in or otherwise provided to) the memory device without receiving another command from the host device.

Figure 7:
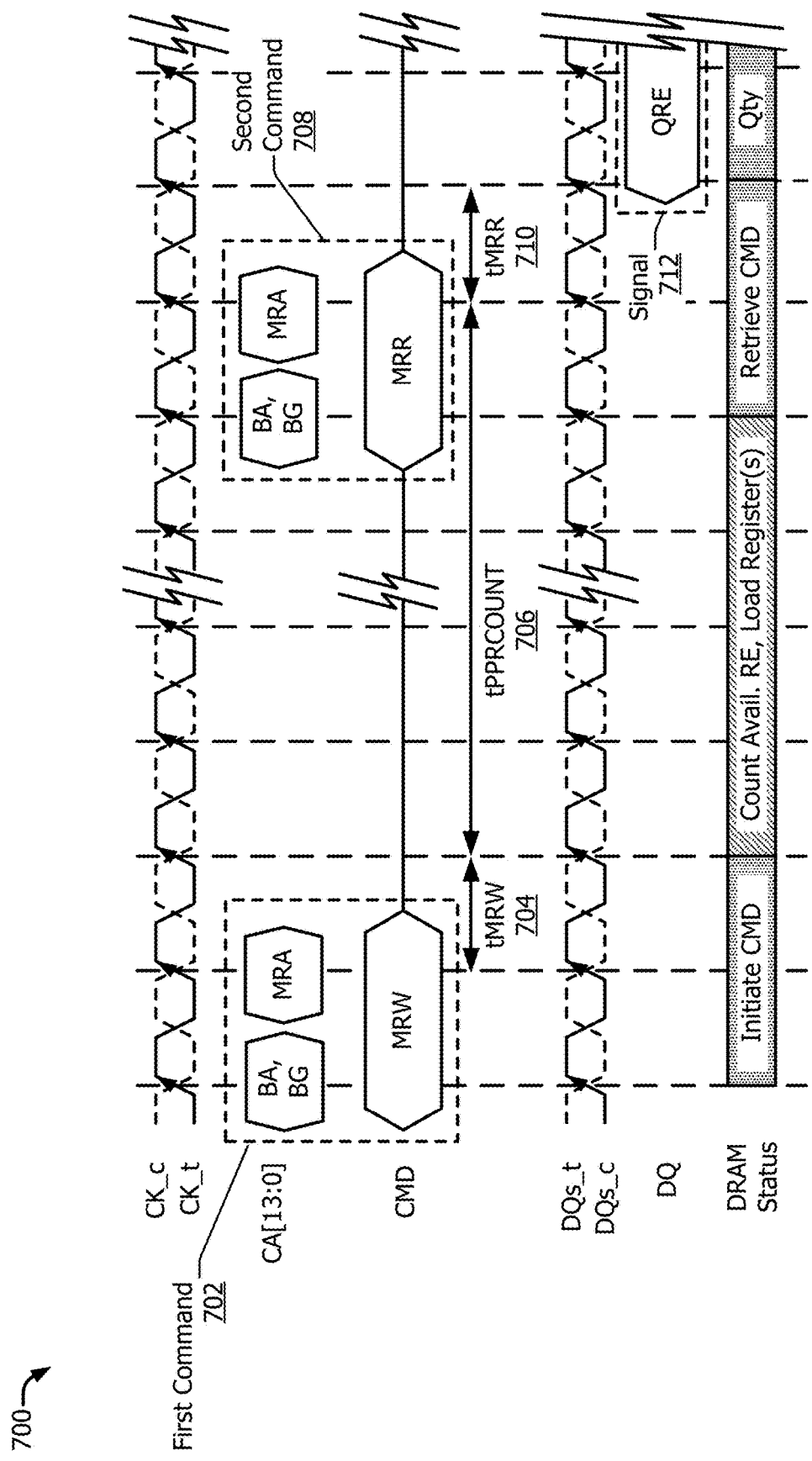
FIG. 7 illustrates an example timing diagram that may be applicable to a communication exchange between a host device and a memory device as part of repair element availability communication.
Figure 8:
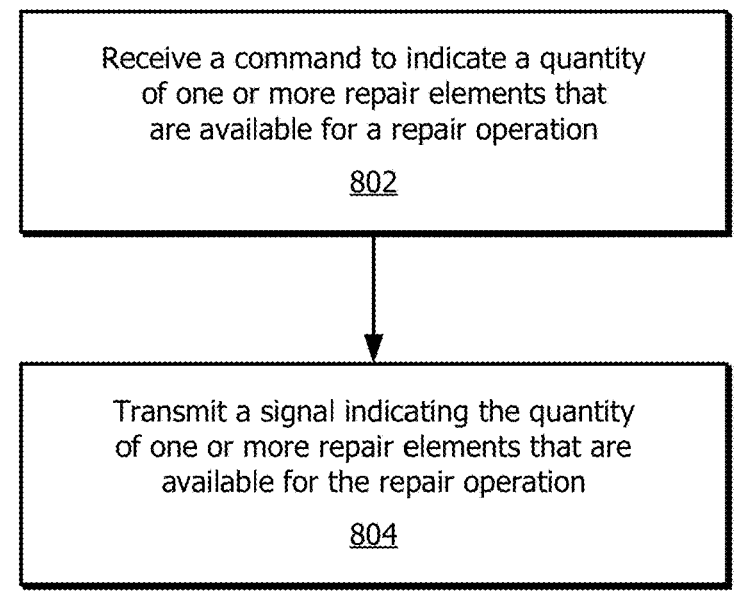
FIG. 8 illustrates an example method performed by a memory device supporting repair element availability communication.
Figure 9:
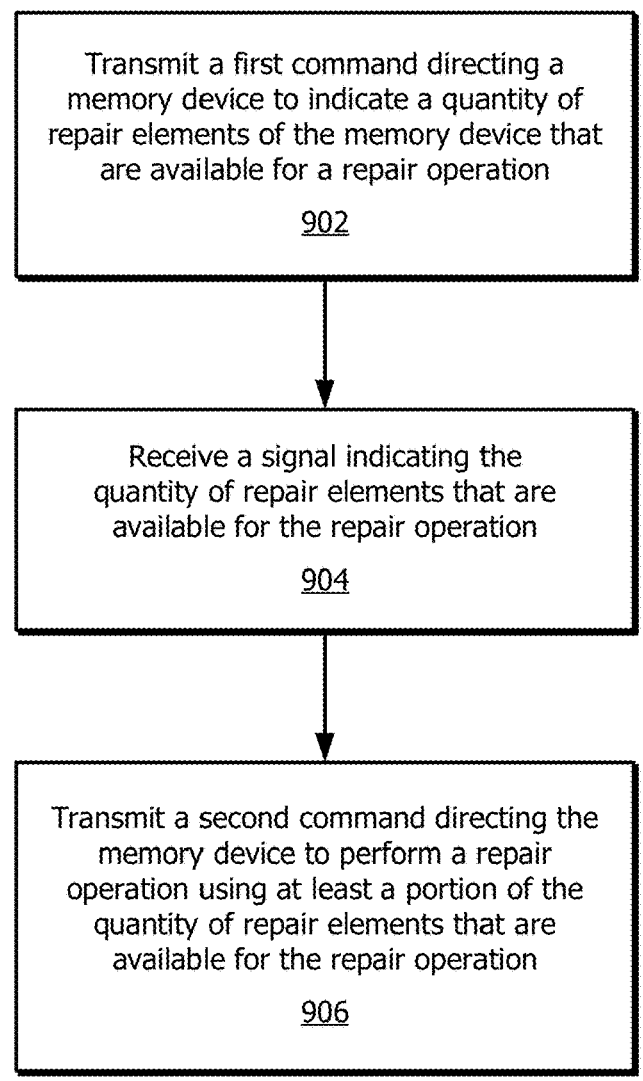
FIG. 9 illustrates an example method performed by a host device supporting repair element availability communication.
Figure 10:
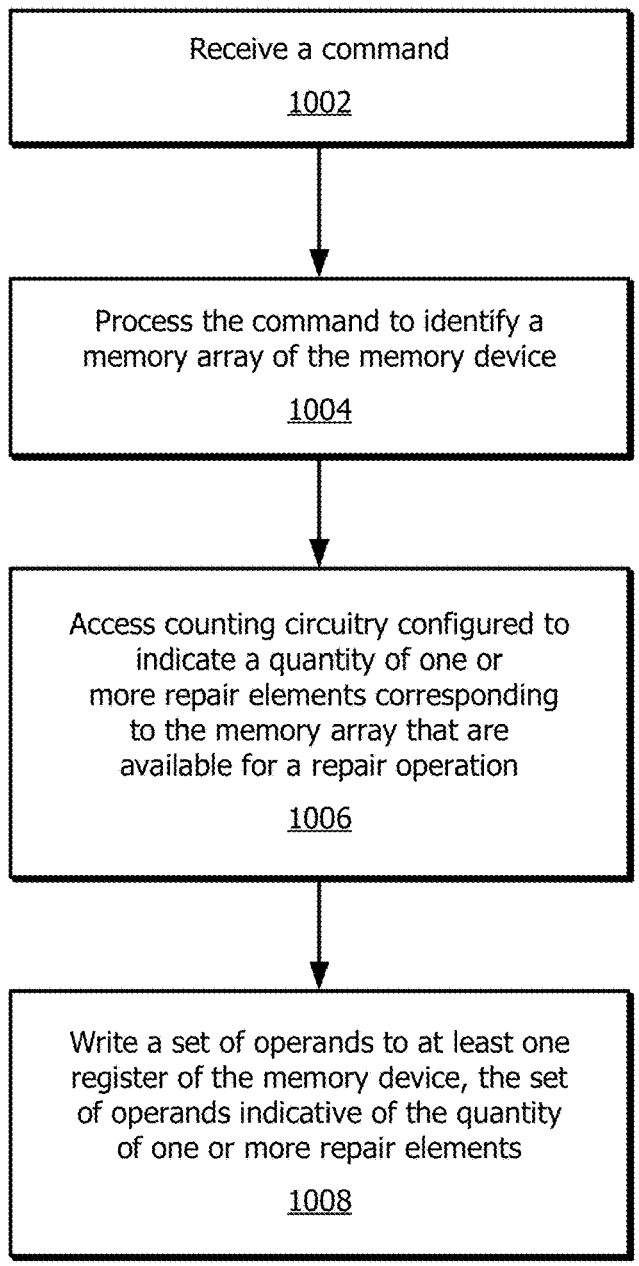
FIG. 10 illustrates another example method performed by a memory device supporting repair element availability communication.

Additional details of operations related to repair element availability communication are presented below. FIG. 4 describes example aspects of signaling to and from the register(s) 206, FIG. 5 describes example aspects of the command(s) 126 that may be issued by the host device 104, and FIG. 6 describes example aspects of the register(s) 206. Further, FIG. 7 illustrates an example timing diagram that may be associated with signaling between the host device 104 and the memory device 108, while FIGS. 8-10 depict example methods in relation to the host device 104 and/or the memory device 108. However, example hardware realizations of the memory device 108 are described next with reference to FIG. 3.

Example Techniques and Hardware

Figure 3:
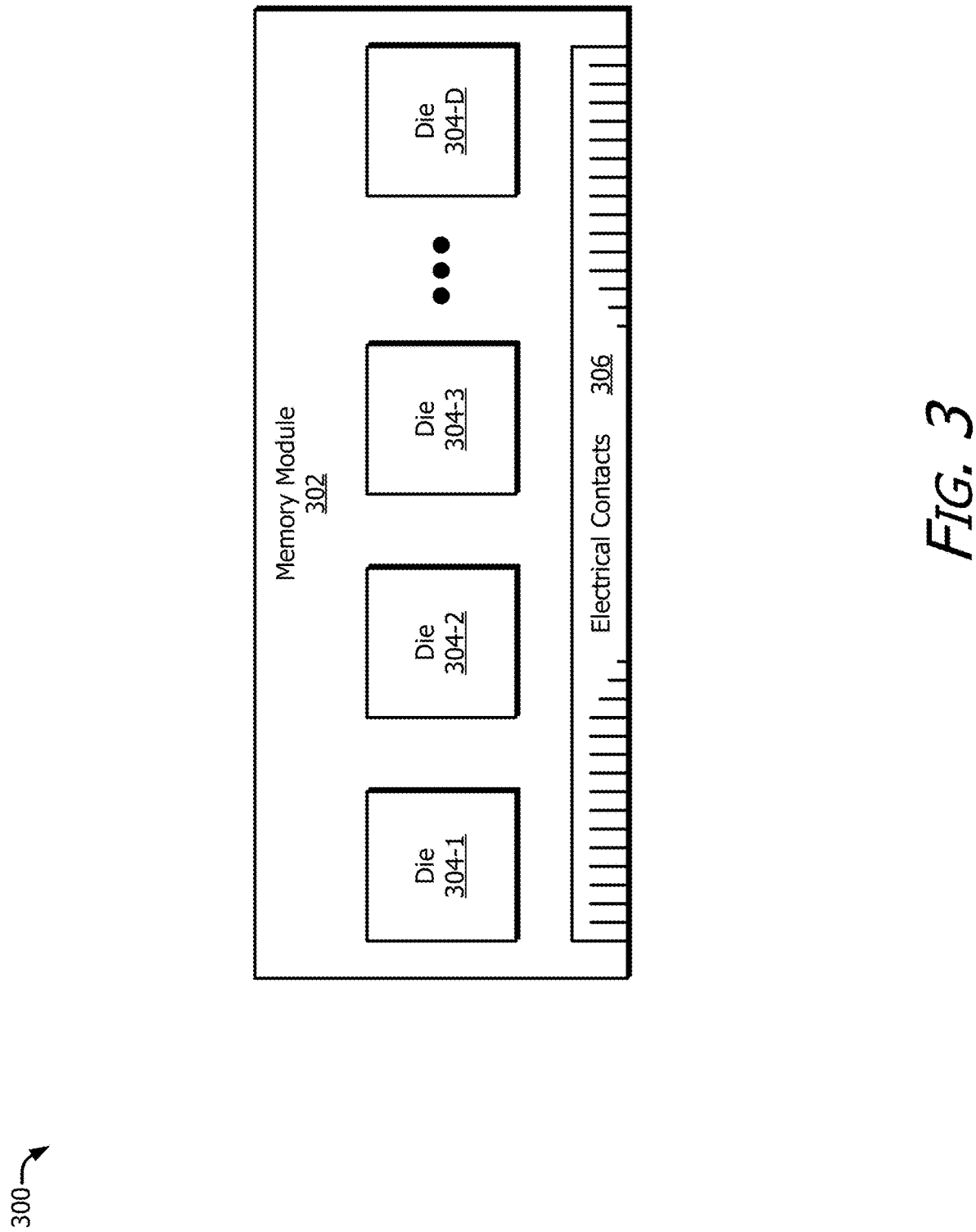
FIG. 3 illustrates memory device examples.
Figure 4:
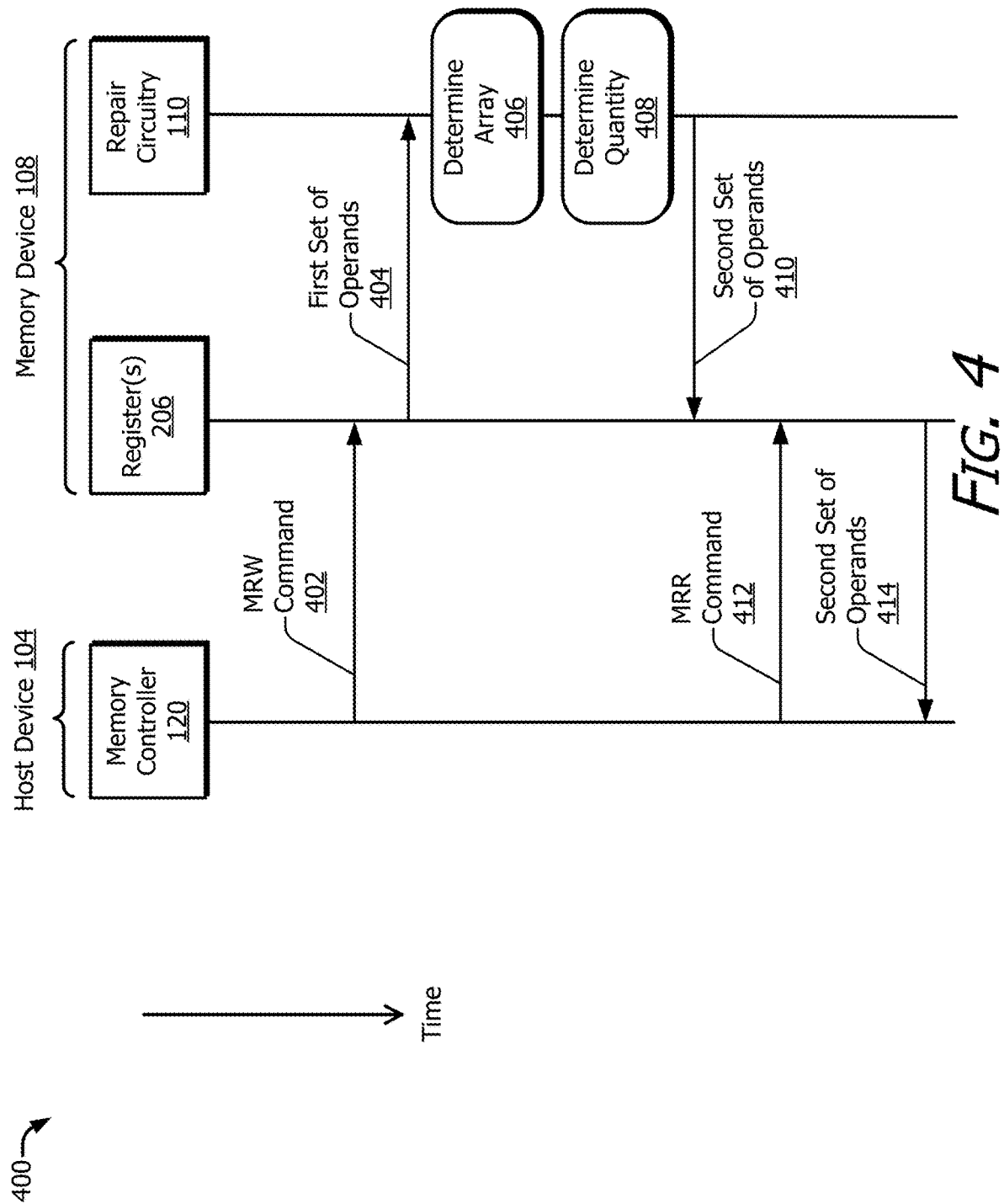
FIG. 4 illustrates a diagram of example signaling transactions and operations used to implement aspects of repair element availability communication.

FIG. 3 illustrates memory device examples at 300. An example memory module 302 includes multiple dies 304. As depicted, the memory module 302 includes a first die 304-1, a second die 304-2, a third die 304-3, . . . , and a $D^{th}$ die 304-D, with "D" representing a positive integer. The memory module 302 can be realized as a SIMM or a DIMM, just to name a couple of examples. A memory device 108 can correspond, for example, to a single die 304, multiple dies 304-1 . . . 304-D, a memory module 302 with at least one die 304, and so forth. As shown, the memory module 302 can include one or more electrical contacts 306 (e.g., pins, edge connectors) to interface the memory module 302 to other components.

The memory module 302 can be implemented in various manners. For example, the memory module 302 may include a PCB, and the multiple dies 304-1 . . . 304-D may be mounted or otherwise disposed on the PCB. The dies 304 (e.g., memory dies) may be arranged in a line or along two or more dimensions (e.g., like a grid or array). The dies 304 may have a common size or may have different sizes. Each die 304 may be like one or more other dies 304 or may be unique on a given memory module 302 in terms of size, shape, data capacity, control circuitries, and so forth. Dies 304 may also be distributed on multiple sides of the memory module 302.

One or more of the dies 304 may be encapsulated in a package, such as a ball grid array (BGA) package that is mounted to the memory module 302. In such instances, a pinout of the BGA package may correspond to a JEDEC standard, such as JESD79-5. Electrically conductive traces of the memory module (e.g., within or on the PCB) may electrically couple the dies 304 to the electrical contacts 306.

In some instances, the electrical contacts 306 may electrically couple the memory module to a host device (e.g., the host device 104 of FIG. 1). In such an instance, the host device 104 may access one or more of the dies 304 through the electrical contacts 306 to perform one or more of the repair element availability communication operations described in greater detail below. Alternatively, a host device 104 can access a die 304 "directly" prior to being mounted to the PCB of the memory module 302.

FIG. 4 illustrates a diagram 400 of example signaling transactions and operations used to implement aspects of repair element availability communication. The diagram 400 may use elements of FIGS. 1 and 2, including the memory controller 120 of FIG. 1 (e.g., the memory controller 120 of the host device 104), as well as the repair circuitry 110 of FIG. 1 and at least one of the register(s) 206 of FIG. 2 (e.g., the memory repair circuitry 110 and the register(s) 206 of the memory device 108). Although the diagram 400 illustrates signaling transactions and operations in a sequence with respect to a timeline, the sequence is by example only (e.g., other sequences may be used).

As part of repair element availability communication operations, the host device 104 may transmit a first signal 402 from the memory controller 120 to the memory device 108. The first signal 402 may correspond to one of the command(s) 126 of FIG. 1 and include an MRW command. In general, the first signal 402 may include a first set of operands. In some instances, and as illustrated, the first signal 402 may be written to the register(s) 206.

Alternatively, the first signal 402 may include an MPC command that includes the first set of operands. In the instance of the first signal 402 including an MPC command, the first signal 402 may be transmitted to either the register(s) 206 or to directly to logic such as the repair circuitry 110 (not illustrated).

Within the memory device 108, the repair circuitry 110 may retrieve the first set of operands 404 from the register(s) 206. The repair circuitry 110 may then perform a first operation 406 (e.g., a determine a portion of an array operation) to determine, using the first set of operands, a memory array (e.g., a memory bank) for which a repair operation may be targeted. The repair circuitry 110 may then perform a second operation 408 (e.g., a determine quantity operation). With the operation 408, the repair circuitry 110 determines an available quantity of repair elements corresponding to the memory array 112 that are available for a repair operation. The repair circuitry 110 may then transmit a third signal 410 that writes a second set of operands to the register(s) 206. The second set of operands may be indicative of the determined quantity of repair elements available for the repair operation.

The host device 104 may then transmit a fourth signal 412 from the memory controller 120 to at least one of the register(s) 206 of the memory device 108. The fourth signal 412 may correspond to one of the commands(s) 126 of FIG. 1 and include an MRR command. In response to the register read command, the memory device 108 may then transmit a fifth signal 414 including the second set of operands from the register(s) 206 to the memory controller 120 of the host device 104.

In general, and with respect to FIG. 4, signaling transactions accessing the register(s) 206 may be dependent on configurations of the memory controller 120, the register(s) 206, or the repair circuitry 110. In some instances, the signaling transactions may include writing to, and reading from, different registers within the memory device 108 (e.g., the first signal 402 may write to a first register of the register(s) 206, the second signal 404 may read from a second register of the register(s) 206 that is different than the first register, and so on). In other instances, the signaling transactions may include writing to, and reading from, a same register of the register(s) 206.

Figure 5:
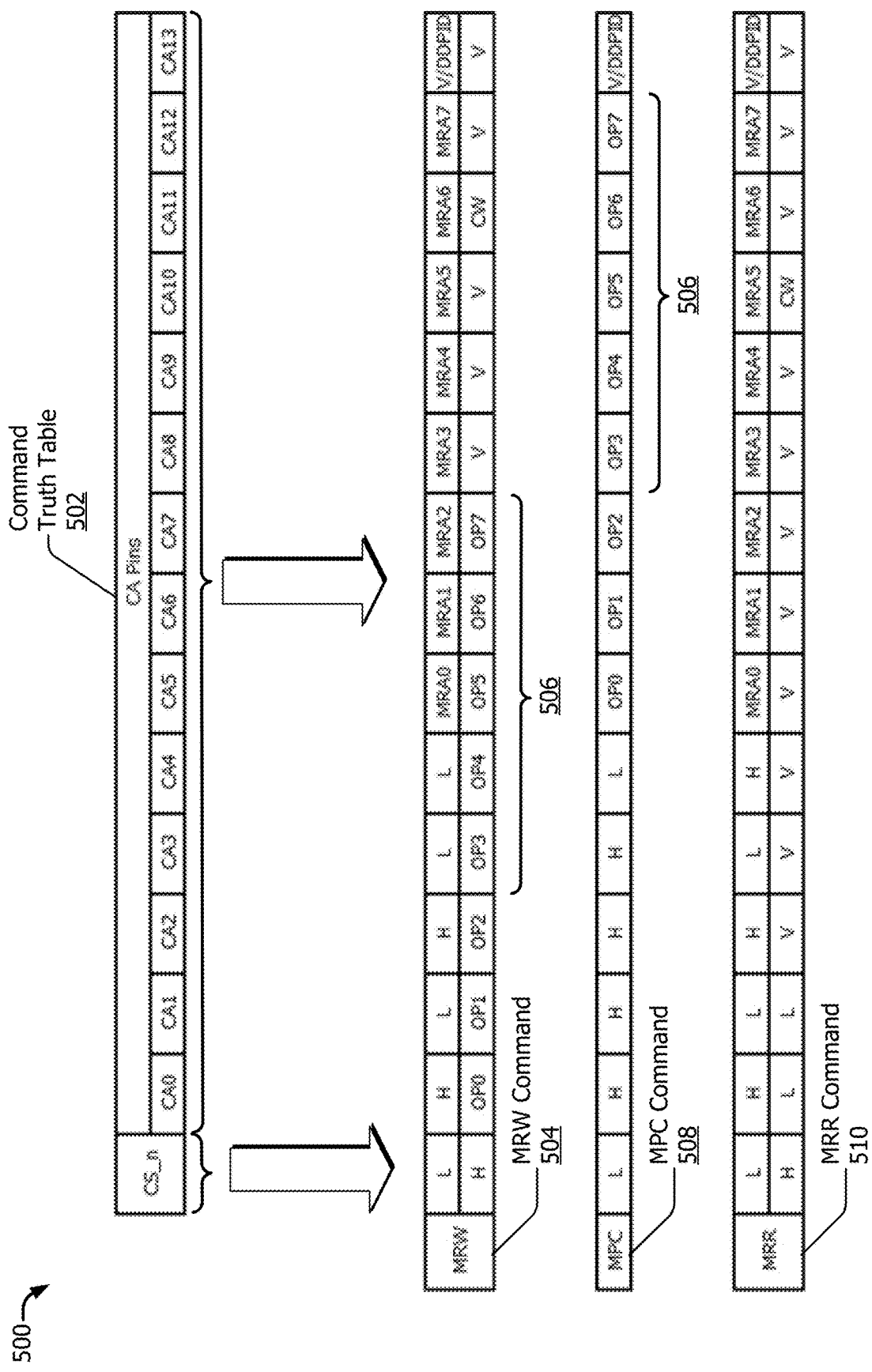
FIG. 5 illustrates example details of a command truth table including a listing of commands that may be used to implement aspects of repair element availability communication.

FIG. 5 illustrates example details 500 of a command truth table 502 including a listing of commands that may be used to implement aspects of repair element availability communication. The truth table 502 may identify aspects of chip select signaling (e.g., CS_n) as well command address pin signaling (e.g., CA0-CA13) that the host device 104 of FIG. 1 may use during transmission of commands to the memory device 108 of FIG. 1. In some instances, a command listed in the truth table 502 may correspond to at least one of the command(s) 126 referenced by FIG. 1.

The command truth table 502 includes an example MRW command 504. The MRW command 504 may be a two-cycle command. For example, as part of a first cycle (e.g., while CS_n is in a low or "L" state), the host device 104 may transmit a first combination of command signals that (i) indicates a type of command (e.g., an MRW command) and (ii) selects a register (e.g., a mode register of the register(s) 206) to be written to during the second cycle. As part of a second cycle (e.g., while CS_n is in a high or "H" state), the host device may transmit a second combination of command signals that includes a set of operands 506. The set of operands 506, written to the selected mode register, may be indicative of at least a portion of a memory array (e.g., the memory array 112 of FIG. 1) for which repair element availability communication is desirable.

The command truth table 502 also includes an example MPC command 508. The MPC command 508 may be a single cycle command that is used as an alternate to the MRW command 504. As part of the cycle (e.g., while CS_n is in a low or "L" state), the host device 104 may transmit a combination of command signals that (i) indicates a type of command (e.g., an MPC command to initiate repair element availability communication operations) and (ii) indicates the set of operands 506. The set of operands 506 may correspond to a memory array (e.g., the memory array 112 of FIG. 1) for which repair element availability communication is desirable.

The MRW command 504 and MPC command 508 are examples of commands that may initiate repair element availability communication operations on the memory device 108. In general, use of a type of command (e.g., the MRW command 504 versus the MPC command 508) as well as a particular combination of command signals (e.g., sequences of operands, CA pin allocations, number of command cycles, etc.) may depend on a configuration of the memory device 108 (e.g., a configuration of the register(s) 206 and/or the repair circuitry 110) or a memory standard to which the devices adhere.

The command truth table 502 further includes an example MRR command 510. In general, the MRR command may include a combination of command signals that is indicative of a mode register (e.g., a register of the register(s) 112)) from which the memory device 108 is to transmit data.

FIG. 6 illustrates details 600 of example registers that a memory device can use to implement aspects of repair element availability communication. The registers may each correspond to one of the register(s) 206 of FIGS. 2 and 4. Furthermore, although FIG. 6 describes each register in the context of an eight-bit wide register that accommodates eight operands, the descriptions are non-limiting (e.g., sixteen-bit wide registers accommodating sixteen operands are possible, etc.).

Register 602 is an example register including a portion 604 and a portion 606. In some instances, the register 602 may correspond to a mode register of a DDR DRAM device (e.g., an hPPR mode register or an sPPR mode register).

The portion 604 may be five-bits wide and be capable of being read from and written to (e.g., R/W). As part of previously described repair element availability communication operations, the portion 604 may store a first set of operands (e.g., OP [7:3]) received as part of a command (e.g., the set of operands 506 received as part of the MRW command 504 of FIG. 5). The first set of operands (e.g., a combination of bank group (BG) and bank address (BA) bits) may indicate a portion of a memory array for which a repair operation is desired.

The portion 606 may be three-bits wide and be capable of being read from. As part of previously described repair element availability communication operations, circuitry that determines a count of available repair elements (e.g., the repair circuitry 110 of FIGS. 1 and 2) may write a second set of operands (e.g., OP [2:0]) to the portion 606. The second set of operands (e.g., a combination of availability (AV) bits) may indicate a quantity of one or more repair elements (e.g., instances of the repair element(s) 114 of FIGS. 1 and 2) that are available for a repair operation.

In some implementations, different combinations of the second set of operands (e.g., bits) may indicate the quantity of available repair elements in different granularities. For instance, the example of three bits may indicate that between zero (0) and seven (7) repair elements are available. In another instance, each combination of bits may represent a bin corresponding to a precise quantity or a range of available repair elements. For example, a first combination of "000" may indicate that no repair elements are available, a second combination of "001" may indicate one repair element is available, a third combination of "110" may indicate that anywhere from two to three repair elements are available, and a fourth combination of "110" may indicate that anywhere from four to seven repair elements are available. Other bit value combinations may represent other ranges.

Register 608 is another example register. Similarly, to the register 602, the register 608 is eight-bits wide and accommodates eight operands. However, in contrast to the second portion 606 of register 602 that stores three AV bits, the portion 610 of register 608 stores five AV bits. In an instance where a multi-purpose command (e.g., the MPC command 508 of FIG. 5) initiates repair element availability communication operations (e.g., where BG or BA bits are integrated into the command), a register such as the register 608 may increase the granularity of repair element availability communication operations by increasing the number of bins from 8 to 32 (e.g., possible combinations of the second set of operands to indicate the quantity of available repair elements increases). For instance, whereas the example combination "110" described above with respect to the portion 606 of the register 602 indicated availability of four to seven repair elements, a combination of "00110" with respect to the portion 610 of the register 608 may indicate an availability of four to five repair elements.

FIG. 7 illustrates an example timing diagram 700 that may be applicable to a memory device as part of repair element availability communication. In some aspects, the timing diagram 700 may be applicable to the host device 104 of FIG. 1 and/or the memory device 108 of FIG. 1, which may be a DDR DRAM memory device.

In general, the timing diagram 700 illustrates a host device (e.g., the host device 104) transmitting and the memory device 108 receiving a first command 702 from the host device. The first command 702 may be received through a command address bus (e.g., the CA bus 122 FIG. 1). As an example, and as illustrated, the first command 702 may correspond to an MRW command (e.g., the MRW command 504 of FIG. 5) that writes a first set of operands into a register (e.g., one of the register(s) 206) of the memory device 108. The host device 104 may transmit the first command 702, directing the memory device 108 to indicate a quantity of one or more repair element(s) 114 that are available for a repair operation. Processing of the first command 702 by the memory device 108 may, in some instances, consume a predetermined time duration specified by a timing parameter such as tMRW 704. The time duration may be specified in terms of nanoseconds (ns) and/or clock cycles.

Upon receiving the first command 702, control circuitry internal to the memory device 108 (e.g., the control circuitry 204 including the repair circuitry 110 of FIG. 1) may decode the first command 702 to (i) determine a portion of the memory device 108 (e.g., a portion of the memory array 112 of FIG. 1, or a memory bank thereof) for which a repair operation is desirable and (ii) perform an operation to determine a number of repair elements (e.g., the repair element(s) 114) available for the repair operation. As an example, the portion of the memory device 108 for which the repair operation is desirable may be decoded from sequences of bits (e.g., a first set of operands included in the first command 702) that may correspond to a bank address (BA) or a bank group (BG).

Techniques that may perform the determining operation include using counting circuitry that may be included in the repair circuitry 110 to scan fuses allocated for repair operations (e.g., count repair elements that are available or that are already used), access a storage mechanism of the memory device 108 that may store a quantity of repair elements used in an earlier repair operation, and so on. Depending on factors that include the technique for counting, a size of the memory array 112, or a number of repair element(s) 114 that may correspond to the memory array 112, the determining operation may consume a predetermined number of clock cycles or time period specified by a timing parameter such as tPPRCOUNT 706. As an example, and tPPRCOUNT 706 may range from 80 ns to 120 ns. During this time period, the control circuitry 204 may store the count (e.g., the second set of operands) in the register(s) 206.

After a duration greater than the sum of tMRW 704 and tPRCOUNT 706, the host device 104 may transmit a second command 708 to the memory device 108. The memory device 108 may receive the second command 708 using a command address bus (e.g., the CA bus 122 of FIG. 1). As an example, and as illustrated, the second command 708 may correspond to an MRR command (e.g., the MRR command 510 of FIG. 5) and identify a register (e.g., one of the register(s) 206) from which to read a seco The second command 708, in general, may direct the memory device 108 to transmit a quantity of one or more repair element(s) 114 that are available for a repair operation. Processing the second command 708 by the memory device 108 may, in some instances, consume a predetermined a duration specified by a timing parameter such as tMRR 710. The time duration may be specified in terms of nanoseconds (ns) and/or clock cycles.

After processing the second command, the memory device can retrieve the bits representing the count of available resource elements from the register targeted by the MRR command. The memory device 108 may transmit a signal 712 to the host device 104. The signal 712 may be transmitted to the host device 104 using a data bus (e.g., the DQ bus 124) and include data indicative of the quantity of repair elements (e.g., QRE) available for the repair operation. In some instances, the memory device 108 may utilize multiple clock cycles (e.g., sixteen clock cycles) to transmit the data indicative of the quantity of repair elements.

In general, timing for repair element availability communication operations may scale with multiple instances of the memory array 112 (e.g., or multiple memory banks thereof). For instance, the time to perform repair element availability communication operations for the complete memory device 108 (tPPRT) can be determined by equation (1) as follows:

$$tPPRT = n(\text{qty of memory portions}) \times [tMRW + tPPRCOUNT + tMRR] \quad (1)$$

In general, the host device 104 accessing the memory device 108 for repair element availability communication operations may be subject to constraints introduced by the timing parameters.

Although the timing diagram 700 references repair element availability communication operations being initiated by an MRW command (e.g., the MRW command 504 of FIG. 5), aspects of the timing diagram 700 may apply to repair element availability communication operations being initiated by another command (e.g., the MPC command 508 of FIG. 5). In an instance where an MPC command initiates repair element availability, variations in the timing diagram 700 may occur (e.g., tMRW 704 may be absent).

Example Methods

This section describes example methods for repair element availability communication with reference to the flow chart(s) and flow diagram(s) of FIGS. 8-10. These descriptions may also refer to components, entities, and other aspects depicted in FIGS. 1-7, which reference is made only by way of example. The described methods are not necessarily limited to performance by one entity or multiple entities operating on one device.

With reference to FIG. 8, at block 802, the memory device 108 receives a series of one or more command(s) 126 as discussed throughout this document. The command(s) 126 may be received by a memory device 108, or particular circuitry included therein. The reception may be inter-chip or intra-chip. In some instances, the memory device 108 may receive the command(s) 126 from the host device 104 using the CA bus 122. In some instances, the command(s).

The command(s) 126 may include the MRW command 504 or the MPC command 508 that direct the memory device 108 to indicate a quantity of one or more repair element(s) 114 that are available to repair the memory device 108. The repair elements(s) 114 may correspond to rows or columns of memory cells within the memory device 108. In some instances, the repair elements(s) 114 may couple to a memory array 112 (e.g., memory bank) of the memory device 108.

The command(s) 126 may include a first set of operands (e.g., OP3, OP4, OP5, OP6, and OP7), such as the set of operands 506 including BG and/or BA bits that relate to bank groups and/or bank addresses of the memory array 112. In some instances, the first set of operands 506 may be written into portions of registers(s) 206 of the memory device 108 (e.g., portion 604 of the register 602).

After receiving the command(s) 126, the memory device 108 (e.g., the repair circuitry 110) may perform operations that include determining (e.g., identifying) the memory array 112 based on the set of operands 506, determining the quantity of the repair element(s) 114 that are available for the repair operation, and writing a second set of operands to at least one of the register(s) 206. Examples of the second set of operands include the set of operands written to the portion 606 of the register 602 (e.g., OP0, OP1, OP2, including AV bits that relate to a quantity of available repair element(s) 114) or the set of operands written to the portion 610 of the register 608 (e.g., OP0, OP1, OP2, OP3, OP4, including AV bits that relate to the quantity of repair elements).

At block 804, the memory device 108 transmits a signal that indicates, to the host device 104, the quantity of available repair element(s) 114. Transmitting the signal may include transmitting, from the register(s) 206, the second set of operands (e.g., the second set of operands including the AV bits). In some instances, transmitting the signal at block 804 may be in response to the memory device 108 receiving, as part of the command(s) 126, an MRR command (e.g., the MRR command 510 of FIG. 5). In some instances, the memory device 108 may transmit the signal using the DQ bus 124.

In general, the method 800 may include one or more additional operations. For instance, and although not shown by FIG. 8, the method 800 may further include the memory device 108 receiving an additional command that directs the memory device 108 to perform a repair operation using at least a portion of the indicated quantity of repair element(s) 114. The command may direct the memory device 108 to perform the repair operation using an hPPR technique or an sPPR technique.

Turning to FIG. 9, an example method 900 is shown. This document has discussed, in one or more examples, the host device 104 transmitting a series of one or more command(s) 126 to the memory device 108 as part of repair element availability communication operations. In some instances, the host device 104, such as a memory controller 120 thereof, may transmit the command(s) 126 to the memory device 108 using the CA bus 122.

The command(s) 126 may include the MRW command 504 or the MPC command 508 that direct the memory device 108 to indicate a quantity of one or more repair element(s) 114 that are available to repair the memory device 108. The repair elements(s) 114 may correspond to rows or columns of memory cells within the memory device 108. In some instances, the repair elements(s) 114 may be coupled to a memory array 112 (e.g., memory bank) of the memory device 108.

With reference to FIG. 9, at block 902, the host device 104 transmits a series of one or more command(s) 126 as discussed throughout this document. The command(s) 126 may be transmitted using circuitry, such as a physical interface, of the host device 104 and, in some instances, inter-chip or intra-chip. The host device may transmit the command(s) 126 to the memory device 108 using the CA bus 122.

The command(s) 126 may include the MRW command 504 or the MPC command 508 that direct the memory device 108 to indicate a quantity of one or more repair element(s) 114 that are available to repair the memory device 108. The command(s) 126 may include a first set of operands (e.g., OP3, OP4, OP5, OP6, and OP7), such as the set of operands 506 including BG and/or BA bits that relate to bank groups and/or bank addresses of the memory array 112.

At block 904, the host device 104 receives a signal that indicates, to the host device 104, the quantity of available repair element(s) 114. In some instances, receiving the signal at block 904 may be in response to the host device 104 transmitting, as part of the command(s) 126, an MRR command (e.g., the MRR command 510 of FIG. 5). Receiving the signal may include receiving the second set of operands (e.g., OP0, OP1, OP2 stored in portion 606 of the register 602 or OP0, OP1, OP2, OP3, OP4, stored in portion 610 of the register 608). The second set of operands, in general, may include AV bits that relate to the quantity of repair element(s) 114 available for the repair operation. In some instances, the host device 104 may receive the signal using the DQ bus 124.

The method 900 includes operations performed at block 906. At block 906, the host device 104 may transmit an additional command that directs the memory device 108 to perform a repair operation using at least a portion of the indicated quantity of repair element(s) 114 (e.g., a portion of the quantity of repair element(s) 114 indicated by the signal received at block 904). In some instances, and as part of operations at block 906, the host device 104 may determine to perform the repair operation based on the quantity of repair element(s) 114 that are available for the repair operation (e.g., determine to perform the repair operation based on the quantity of repair elements indicated by the signal received at block 904). The additional command at block 906 (e.g., an additional command(s) 126, including another instance of the MRW command 504 or the MPC command 508) may direct the memory device 108 to perform the repair operation using an hPPR technique or an sPPR technique.

FIG. 10 shows another example method 1000 that may be performed by the memory device 108. As part of the method 1000, and at block 1002, the memory device 108 may receive a command (e.g., one of the command(s) 126, such as the MRW command 504 or the MPC command 508). The reception may be inter-chip or intra-chip. In some instances, the memory device 108 may receive the command(s) 126 from the host device 104 using the CA bus 122.

Continuing at block 1004, the memory device 108 (e.g., the repair circuitry 110) may process the command(s) received at block 1002. The memory device 108 may process the command(s) 126 to determine that it is to identify a memory array (e.g., the memory array 112) of the memory device 108. To identify the memory array 112, the repair circuitry 110 may decode a set of operands included in the command(s) 126 (e.g., the set of operands 506 OP3, OP4, OP5, OP6, and OP7 that include BG and/or BA).

At block 1006, the repair circuitry 110 may further process the command(s) 126 received at block 1002 to access counting circuitry (e.g., the counting circuitry may be a subset of the repair circuitry 110) configured to indicate a quantity of one or more repair element(s) 114 corresponding to the memory array 112 that are available for a repair operation. To indicate the quantity, and as an example, the counting circuitry may scan fuses allocated for repair operations (e.g., perform a scanning operation to determine, from fuses allocated for repair operations, how many are already programmed). As another example, the counting circuitry may retrieve the quantity from a storage mechanism on the memory device 108.

Another operation of the method 1000, as shown at block 1008, includes writing a set of operands to at least one register of the memory device 108 (e.g., the repair circuitry 110 may write the set of operands OP0, OP1, OP2 to the portion 606 of the register 602 or the set of operands OP0, OP1, OP2, OP3, and OP4 to the portion 610 of the register 608). The set of operands, in general, may include a combination or sequence of AV bits (e.g., AV0, AV1, and AV2 or AV0, AV1, AV2, AV3, and AV4).

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1-7, the components of which may be further divided, combined, rearranged, and so on. The devices and components of these figures generally represent hardware, such as electronic devices, packaged modules, IC chips, or circuits; firmware or the actions thereof; software; or a combination thereof. With reference to FIGS. 1-7, in some cases, a host device 104 or a memory device 108 may individually perform the operations of these methods. In other cases, a host device 104 and a memory device 108 may jointly perform the operations. FIGS. 1-7 illustrate example circuitry that may perform at least some of these operations. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Aspects of implementing repair element availability communication, as described above, include command signaling from a host device to the memory device. Aspects also include the use of registers and operative logic that can be included on the memory device to (i) determine a quantity of repair elements that may be available for a repair operation and (ii) signal the quantity to the host device.

Although implementations for repair element availability communication have been described in language specific to certain features and/or methods, the subject of the appended claims is not necessarily limited to the specific features or methods described. Rather, the specific features and methods are disclosed as example implementations for repair element availability communication.

What is claimed is:

1. A method, comprising:
   receiving, by a memory device, a command directing the memory device to indicate a quantity of one or more repair elements of the memory device that are available for a repair operation for a first memory portion, the one or more repair elements comprising at least one of a row or a column, the quantity configured to represent more than two different values;
   counting, by the memory device, the quantity of one or more repair elements that are available for the repair operation for the first memory portion;
   transmitting, by the memory device, a signal indicating the quantity of one or more repair elements that are available for the repair operation for the first memory portion; and
   repeating, by the memory device, the receiving, the counting, and the transmitting for a second memory portion.

2. The method of claim 1, wherein the memory device has a row-and-column architecture.

3. The method of claim 1, wherein:
the first memory portion comprises a first memory bank; and
the second memory portion comprises a second memory bank.

4. The method of claim 1, further comprising:
receiving, by the memory device, a command to write a first set of operands to at least one register of the memory device.

5. The method of claim 4, further comprising:
determining, by the memory device, at least a portion of a memory array based on the first set of operands, the at least a portion of the memory array comprising the first memory portion;
determining, by the memory device, the quantity of one or more repair elements corresponding to the portion of the memory array that are available for the repair operation based on the counting; and
writing, by the memory device, a second set of operands to at least one register of the memory device, the second set of operands indicative of the quantity of one or more repair elements corresponding to the portion of the memory array that are available for the repair operation.

6. The method of claim 5, further comprising:
transmitting, by the memory device, the second set of operands.

7. The method of claim 6, wherein the transmitting of the signal by the memory device comprises:
transmitting, by the memory device, the second set of operands in response to receiving another command to read the at least one register.

8. The method of claim 7, further comprising:
receiving, by the memory device, a mode register read (MRR) command to read the at least one register.

9. The method of claim 1, further comprising:
determining, by the memory device in response to receiving the command, the quantity of one or more repair elements that are available for the repair operation based on the counting.

10. The method of claim 9, further comprising:
receiving, by the memory device, a mode register write (MRW) command directing the memory device to indicate the quantity of one or more repair elements of the memory device that are available for the repair operation.

11. The method of claim 9, further comprising:
receiving, by the memory device, a multi-purpose (MPC) command directing the memory device to indicate the quantity of one or more repair elements of the memory device that are available for the repair operation.

12. The method of claim 1, further comprising:
receiving, by the memory device, another command directing the memory device to perform the repair operation by applying a hard post-package repair (hPPR) technique using at least a portion of the quantity of one or more repair elements that are available for the repair operation.

13. The method of claim 1, further comprising:
receiving, by the memory device, another command directing the memory device to perform the repair operation by applying a soft post-package repair (sPPR) technique using at least a portion of the quantity of one or more repair elements that are available for the repair operation.

14. A memory device, comprising:
a memory array including a first memory portion and a second memory portion;
multiple repair elements corresponding to the memory array; and
control circuitry coupled to the multiple repair elements and configured to:
receive a command directing the memory device to indicate a quantity of repair elements of the multiple repair elements that are available for a repair operation for the first memory portion of the memory array, the multiple repair elements comprising at least one of a row or a column, the quantity configured to represent more than two different values;
count the quantity of repair elements that are available for the repair operation for the first memory portion;
transmit a signal indicating the quantity of repair elements that are available for the repair operation for the first memory portion; and
repeat the receipt of a command, the count of a quantity, and the transmission of a signal for the second memory portion.

15. The memory device of claim 14, wherein the memory array comprises dynamic random-access memory cells.

16. The memory device of claim 14, wherein the control circuitry comprises one or more flip flops configured to store the quantity of repair elements that are available for the repair operation.

17. The memory device of claim 14, further comprising:
multiple registers coupled to the control circuitry,
wherein the control circuitry is configured to read operands from or write operands to at least one register of the multiple registers.

18. The memory device of claim 17, wherein the at least one register has a width of eight bits.

19. The memory device of claim 17, wherein the at least one register comprises:
a first portion configured to store a first set of operands that indicates at least a portion of the memory array; and
a second portion configured to store a second set of operands that indicates the quantity of repair elements that are available for the repair operation for the first memory portion of the memory array.

20. The memory device of claim 19, wherein the at least one register corresponds to a hard post-package repair (hPPR) resources mode register.

21. The memory device of claim 20, wherein the control circuitry is further configured to receive another command directing the memory device to perform the repair operation by applying a hard post-package repair (hPPR) technique using at least a portion of the quantity of repair elements that are available for the repair operation.

22. The memory device of claim 19, wherein the at least one register corresponds to a soft post-package repair (sPPR) resources mode register.

23. The memory device of claim 22, wherein the control circuitry is further configured to receive another command directing the memory device to perform the repair operation by applying a soft post-package repair (sPPR) technique using at least a portion of the quantity of repair elements that are available for the repair operation.

24. A method, comprising:
transmitting, by a host device, a command directing a memory device to count and indicate a quantity of repair elements of the memory device that are available for a repair operation for a first memory portion, the repair elements comprising at least one of a row or a column, the quantity configured to represent more than two different values;

receiving, by the host device, a signal indicating the quantity of repair elements that are available for the repair operation for the first memory portion; and repeating, by the host device, the transmitting of a command directing the memory device to count and indicate a quantity of repair elements and the receiving of a signal for a second memory portion.

25. The method of claim 24, further comprising:
transmitting, by the host device, a multi-purpose command (MPC) that directs the memory device to count and indicate the quantity of repair elements that are available for the repair operation.

26. The method of claim 24, further comprising:
transmitting, by the host device, a command to write to a register of the memory device, the command to write to a register including a first set of operands identifying a memory bank of the memory device that corresponds to the quantity of repair elements.

27. The method of claim 26, further comprising:
transmitting, by the host device, a command to read from a register of the memory device, the command to read from a register directing the memory device to transmit a second set of operands that indicates the quantity of repair elements.

28. The method of claim 24, further comprising:
transmitting, by the host device, another command directing the memory device to perform the repair operation using at least a portion of the quantity of repair elements that are available for the repair operation.

29. The method of claim 28, further comprising:
determining, by the host device, to perform the repair operation based on the quantity of repair elements that are available for the repair operation.

30. The method of claim 28, wherein the other command directs the memory device to perform the repair operation by applying a hard post-package repair (hPPR) technique to the portion of the quantity of repair elements that are available for the repair operation.

31. The method of claim 28, wherein the other command directs the memory device to perform the repair operation by applying a soft post-package repair (sPPR) technique to the portion of the quantity of repair elements that are available for the repair operation.

32. A host device, comprising:
a physical interface; and
a memory controller coupled to the physical interface, the memory controller configured to:
transmit, to a memory device via the physical interface, a command directing the memory device to count and indicate a quantity of repair elements of the memory device that are available for a repair operation for a first memory portion, the repair elements comprising at least one of a row or a column, the quantity configured to represent more than two different values;
receive, from the memory device via the physical interface, a signal indicating the quantity of repair elements that are available for the repair operation for the first memory portion; and
repeat the transmission of a command directing the memory device to count and indicate a quantity of repair elements and the receipt of a signal for a second memory portion.

33. The host device of claim 32, wherein the memory controller is further configured to:
transmit, to the memory device via the physical interface, a mode register write (MRW) command that directs the memory device to write a set of operands to at least one register of the memory device, the set of operands indicative of at least a portion of a memory array of the memory device; and
transmit, to the memory device via the physical interface, a mode register read (MRR) command that directs the memory device to transmit the signal indicating the quantity of repair elements that are available for the repair operation for the portion of the memory array of the memory device.

34. The host device of claim 32, wherein the memory controller is further configured to:
transmit, to the memory device via the physical interface, a multi-purpose command (MPC) that directs the memory device to count and indicate the quantity of repair elements that are available for the repair operation.

35. A method, comprising:
receiving, by a memory device, a command;
processing, by the memory device, the command to identify at least a portion of a memory array of the memory device;
accessing, by the memory device, counting circuitry configured to count and indicate a quantity of one or more repair elements corresponding to the portion of the memory array that are available for a repair operation, the one or more repair elements comprising at least one of a row or a column, the quantity configured to represent more than two different values; and
writing, by the memory device, a set of operands to at least one register of the memory device, the set of operands indicative of the quantity of one or more repair elements corresponding to the portion of the memory array that are available for the repair operation.

36. The method of claim 35, further comprising:
performing, by the counting circuitry, a scanning operation to determine how many fuses allocated for repair operations are already programmed.

37. The method of claim 35, further comprising:
accessing, by the counting circuitry, a storage mechanism of the memory device that stores the quantity.

* * * * *